United States Patent [19]
Pinney et al.

[11] Patent Number: 5,547,405
[45] Date of Patent: Aug. 20, 1996

[54] CROSSTALK SUPPRESSING CONNECTOR

[75] Inventors: David R. Pinney, Shefford; Kevin Stanton, Kettering, both of United Kingdom

[73] Assignee: ITT Industries Limited, Basingstoke, England

[21] Appl. No.: 311,247

[22] Filed: Sep. 23, 1994

[30] Foreign Application Priority Data

Dec. 3, 1993 [GB] United Kingdom ............ 9324816

[51] Int. Cl.$^6$ ............... H01R 23/02; H01R 4/24
[52] U.S. Cl. ............... 439/894; 439/941; 439/676
[58] Field of Search ............... 439/894.1, 676, 439/344, 941; 333/1, 12

[56] References Cited

U.S. PATENT DOCUMENTS

| | | | |
|---|---|---|---|
| 5,186,647 | 2/1993 | Denkmann et al. | 439/395 |
| 5,299,956 | 4/1994 | Brownell et al. | 439/638 |
| 5,326,284 | 7/1994 | Bonbot et al. | 439/676 |
| 5,362,257 | 11/1994 | Neal et al. | 439/941 |
| 5,399,106 | 3/1995 | Ferry | 439/620 |
| 5,402,200 | 4/1995 | Chen | 439/404 |
| 5,470,244 | 11/1995 | Lim et al. | 439/189 |

FOREIGN PATENT DOCUMENTS

| | | |
|---|---|---|
| 0525703 | 7/1992 | European Pat. Off. . |
| 0558225 | 2/1993 | European Pat. Off. . |

Primary Examiner—Gary F. Paumen
Assistant Examiner—T. C. Patel
Attorney, Agent, or Firm—Thomas L. Peterson

[57] ABSTRACT

An electrical connector is provided with at least two pairs of signal-carrying contacts, which provides a low cost, compact, and rugged construction for minimizing crosstalk. While two initial contacts (A, B, FIG. 2) of the two pairs (102, 104) lie adjacent to each other, so there is unwanted capacitive and inductive coupling between them, secondary contacts (C, D) of the two pairs do not lie adjacent to the initial contacts and therefore are not as closely coupled to the initial contacts. Each secondary contact is capacitively coupled to an initial contact of the other pair by a lateral extension (110, 122) formed in one of the contacts which overlies the other contact in a local region (120) of limited length. The capacitive coupling resulting from the lateral extensions substantially cancels crosstalk that otherwise would exist.

10 Claims, 9 Drawing Sheets 5,547,405

CROSSTALK SUPPRESSING CONNECTOR

BACKGROUND OF THE INVENTION

An electrical signal is commonly carried by a pair of wires, wherein one wire carries a positive signal with respect to ground while the other carries a negative signal with respect to ground, to provide a balance around earth, or ground. The wires are twisted around each other, so any applied EMI (electromagnetic interference) is applied equally to the two wires and their voltage difference does not change. When pairs of wires are connected to a connector whose contacts are of flat configurations (and not twisted), and carry high frequency signals (usually over 1 MHz), there will be crosstalk between the connector contacts, wherein an emission (due to capacitive and inductive coupling) from one contact of a first pair of contacts, is picked up by one contact of a second pair but substantially not by the other contact of the second pair.

Crosstalk between adjacent lines or contacts of an electrical connector can be minimized by adding neutralizing capacitive couplings. For example, if initial contacts of two pairs lie adjacent but secondary contacts of the two pairs are far apart, crosstalk can be reduced by capacitively coupling each initial contact of a pair to the secondary contact of the other pair. Such coupling will result in transferring equal crosstalk voltages to the initial and secondary contacts of a pair, so the difference in voltage between the two contacts of the pair will not be changed. Prior attempts to capacitively or electromagnetically couple different contacts have involved modifications to the connector which were costly or unreliable. U.S. Pat. No. 5,186,647 owned by AT&T discloses an arrangement in which the middle of connector contacts cross one another so crosstalk is induced in opposite halves of the contact, in opposite phase, to effect cancellation. The re-entrant bends of such a connector are difficult to manufacture, especially because the location of the crossover points is critical. Also, this approach produces poor cancellation when the induction lengths are long, because the propagation delay prevents achievement of the required 180° phase shift.

Another technique disclosed in European Patent Application 92112808.8 (0525703A1) owned by Siemen, employs a printed circuit board coupling with a double crossover of interfering lines to produce anti-phase coupling for crosstalk cancellation. This arrangement requires a separate printed circuit board with multiple crossing arrangements, which also adds to the expense. It is possible to use discrete capacitance or inductive couplings between contacts, but this is also costly and reduces reliability. An electrical connector with crosstalk compensation, which is reliable and relatively simple to manufacture while avoiding discrete components, would be of value.

SUMMARY OF THE INVENTION

In accordance with one embodiment of the present invention, an electrical connector is provided with at least two pairs of contacts, which cancels a large portion of crosstalk in a relatively simple and low cost arrangement. While the contacts extend parallel to each other in a longitudinal direction, a pair of nonadjacent contacts are coupled in a local region of limited longitudinal length. In that local region, one of the contacts is provided with a lateral extension, with the lateral extension lying facewise adjacent to the other contact to be coupled to. At locations where the contacts or their extensions lie facewise adjacent to each other, a sheet of dielectric material lies between the lateral extension of one contact and the other contact to prevent them from touching each other, to assure only capacitive coupling. Where the contacts are stamped from metal sheets, the lateral extensions are formed when the contacts are stamped from the sheets.

In an embodiment of the invention which includes four pairs of contacts, the contacts also extend primarily parallel to each other in a longitudinal direction. Two of the eight contacts have lateral extensions that each capacitive couple to each of two other contacts.

The novel features of the invention are set forth with particularity in the appended claims. The invention will be best understood from the following description when read in conjunction with the accompanying drawings.

DESCRIPTION OF THE PREFERRED EMBODIMENTS

Figure 1:
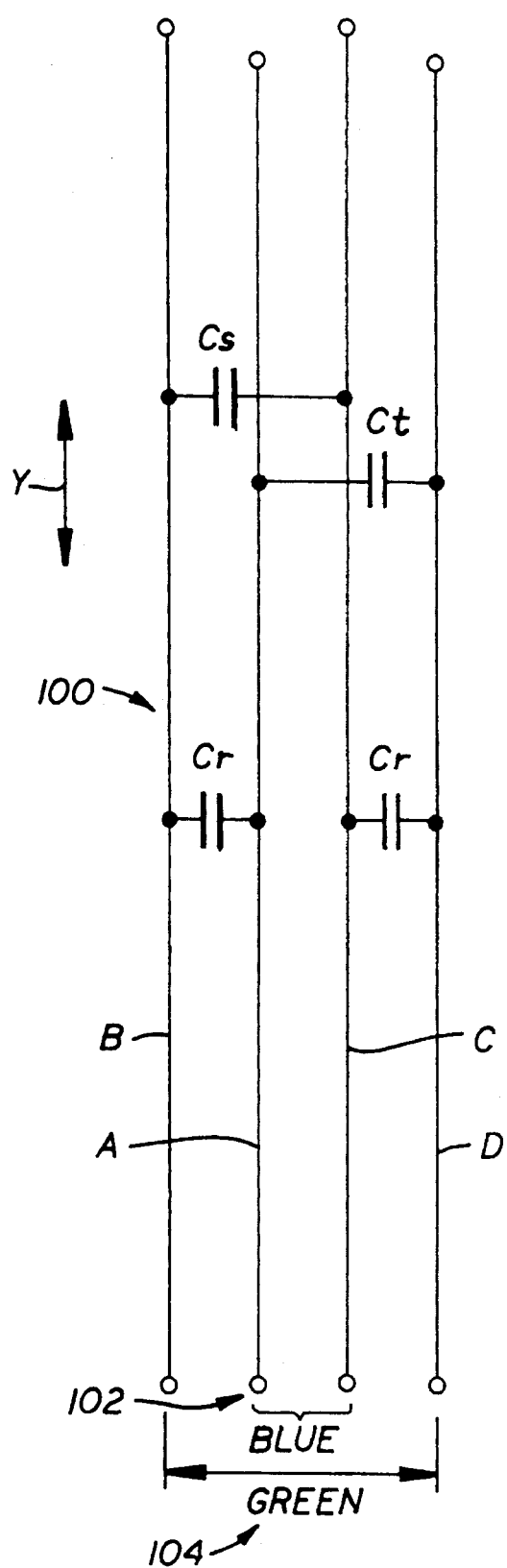
FIG. 1 is a schematic diagram of a first embodiment of the invention, showing capacitive coupling between contacts of two pairs of contacts, with Cr indicated as capacitances but representing distributed inductive coupling as well as distributed capacitive coupling.

FIG. 1 illustrates a contact arrangement 100 of a four terminal inline connector intended for use in accordance with EIA/TIA 568B wiring practices. The contact arrangement 100 includes two pairs of contacts 102, 104, with one pair being designated "blue" and the other being designated "green" which may correspond to color coding to indicate different pairs of wires. The first pair 102 includes two contacts A, C, while the second pair 104 includes two contacts B, D. Two initial contacts A, B of the two pairs lie adjacent to each other along the long longitudinal length in the direction Y of the contacts. Their adjacency through the connector results in significant capacitive and inductive coupling between the adjacent or initial contacts A, B, as indicated by capacitance Cr. This coupling results in crosstalk, wherein a small voltage is induced in each contact A, B corresponding to the signal passing through the other adjacent contact B, A. Such crosstalk is canceled by providing canceling capacitances Cs and Ct. Each canceling capacitance such as Cs couples one of the adjacent or initial contacts B of one pair to the nonadjacent or secondary contact C of the other pair. The result is that signals passing through contact B produce an equal voltage change in both contacts A, C of the first pair. Such equal change results in little change in the difference between voltages of the pair A, C, and therefore results in almost complete canceling of crosstalk. The coupling between contacts C, D is indicated by another capacitance Cr, and the resulting crosstalk is canceled by the canceling capacitances.

Figure 2:
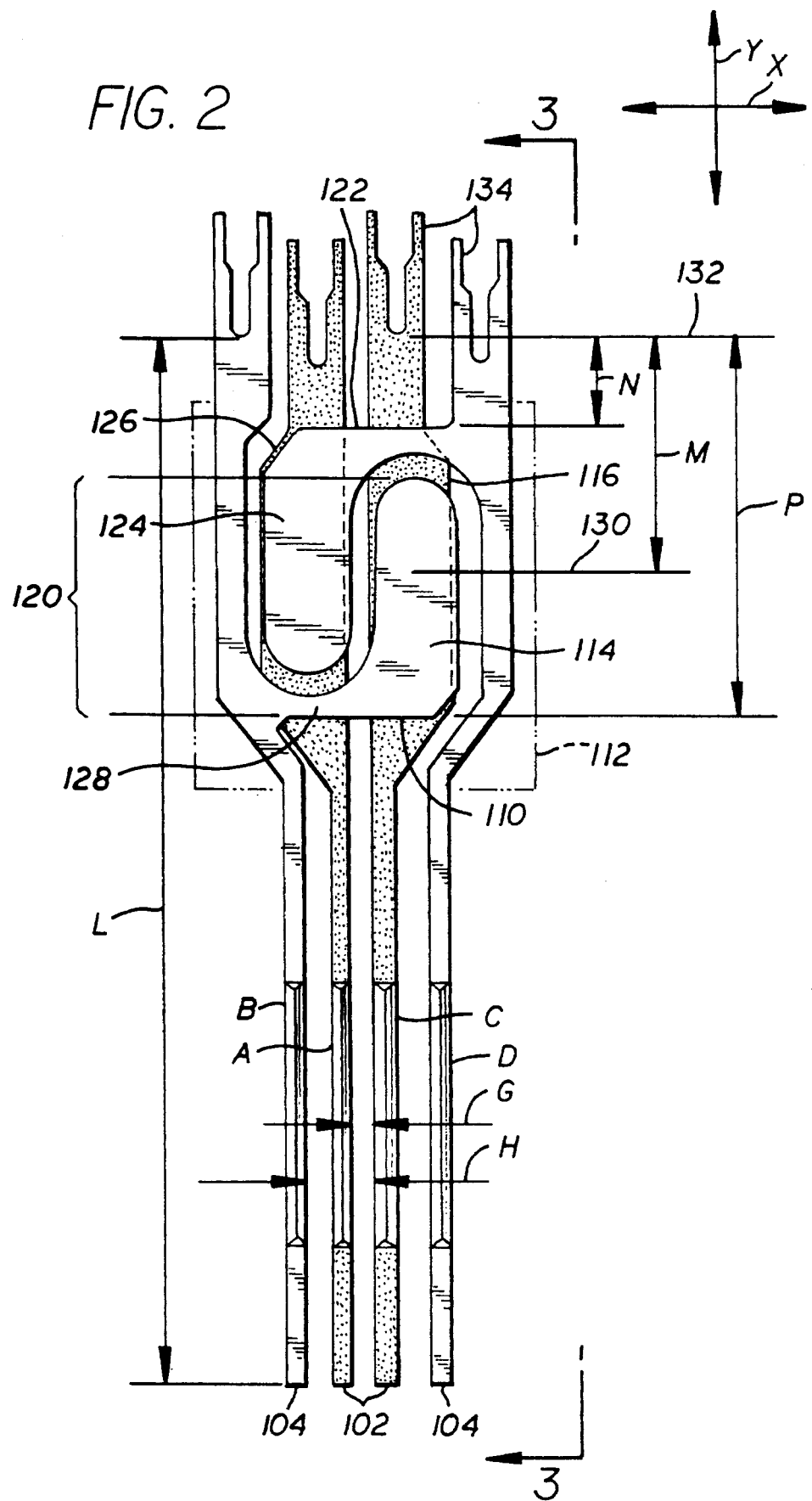
FIG. 2 is a plan view of the two pairs of contacts indicated in FIG. 1, showing them fully formed and as they would lie in a connector housing but without showing bends in the contacts.

Applicant provides the capacitance Cs in the manner shown in FIG. 2, by providing a lateral extension 110, in the lateral direction X from one of the contacts B of the set (B, C) that are to be capacitively coupled, to the other contact C of the set. A dielectric spacer 112 in the form of a sheet or film, lies between the extension end 114 and a facewise adjacent portion 116 of the other contact C. The spacer 112 prevents the extension 110 of contact B from actually touching the contact C. However, the spacer 112 is thin, so there is a high capacitance per unit area of contact overlap, and per unit length along the longitudinal direction Y. This results in the local region 120 where the contacts (including an extension of one) are facewise adjacent, being of only small longitudinal length. The length of the region 120 is less than half the longitudinal length L of the contacts where one contact of one pair lies adjacent to a contact of the other pair. The distance H between nonadjacent contacts usually is at least twice the distance G between adjacent contacts.

The contact D of the second pair also has a lateral extension 122 which results in an extension end 124 lying facewise adjacent to an adjacent portion 126 of the contact A. This results in a capacitive coupling as indicated at Ct in FIG. 1. It is noted that each of the adjacent portions 116, 126 of contacts C and A are of greater width in the lateral direction X than the rest of each corresponding contact. The greater lateral width results in greater capacitive coupling over a shorter longitudinal distance. It also may be noted that each lateral extension such as 110 has a middle part 128 of short longitudinal length, where it crosses a contact such as A where no capacitive coupling is desired. It also may be noted that the extensions 110, 112 are substantially identical, although differently oriented.

Figure 3:
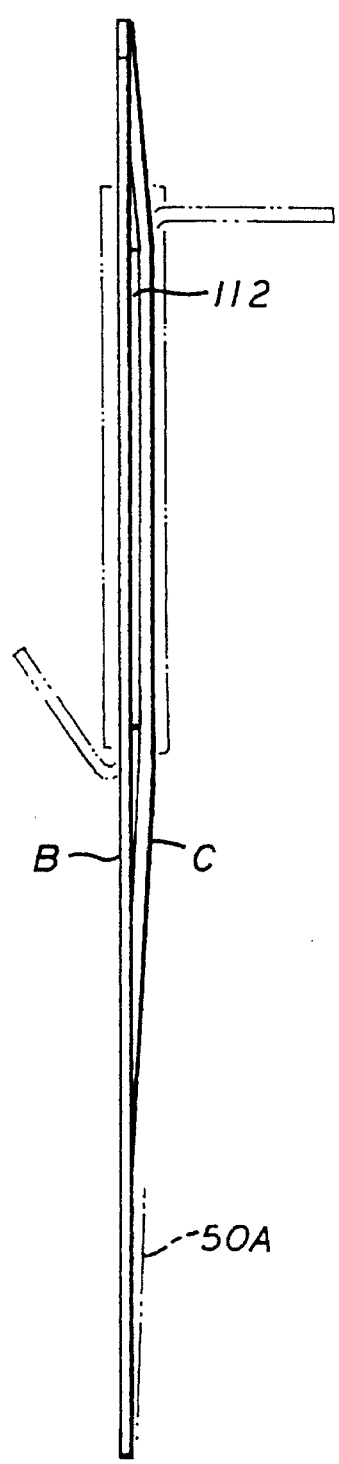
FIG. 3 is a view taken on the line 3—3 of FIG. 2.
Figure 4:
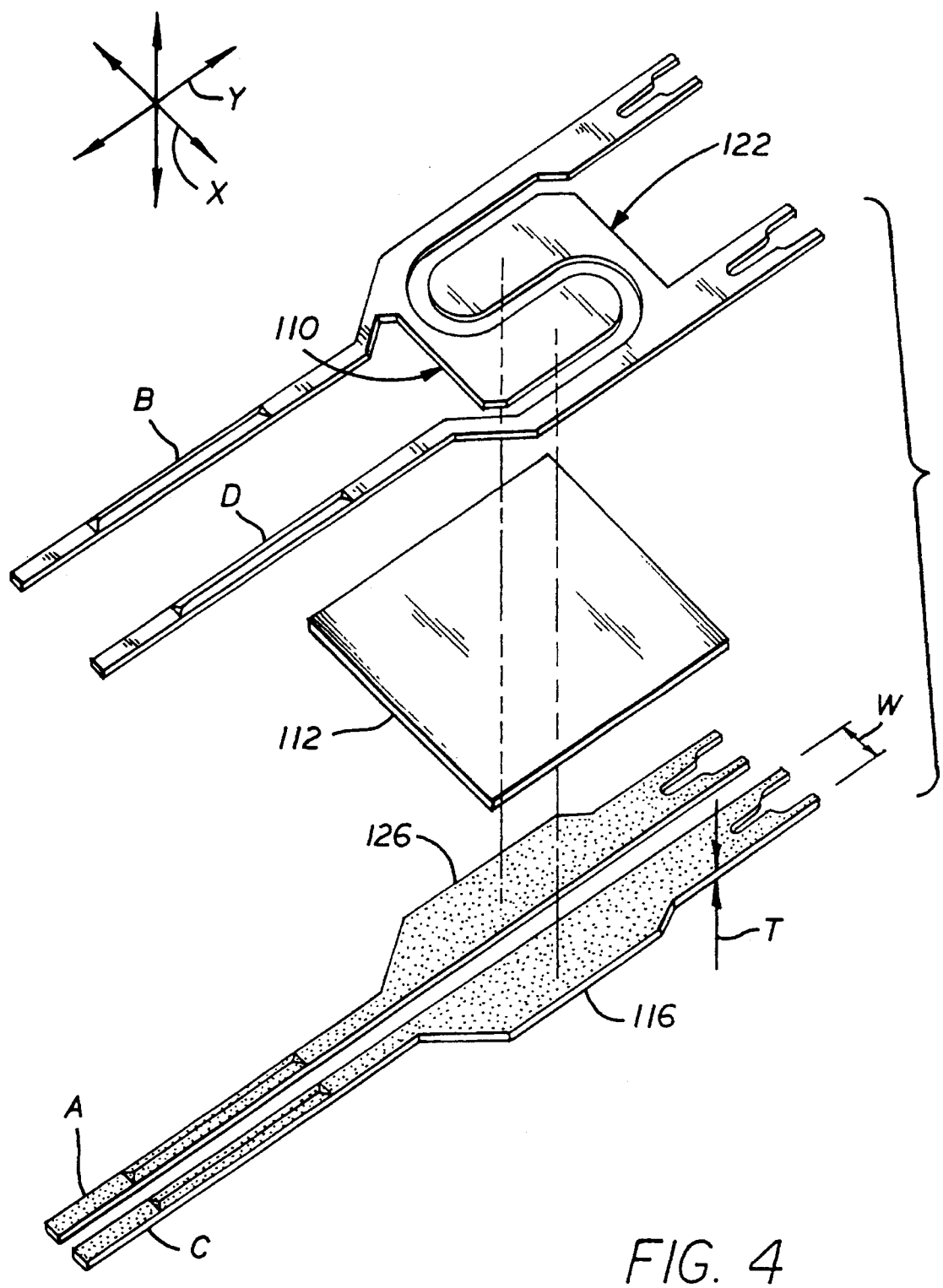
FIG. 4 is an exploded isometric view of the contact arrangement of FIG. 2.

Applicant can constructs the connector by forming the middle contacts A, C on a single lead frame (along with pairs of contacts for other connectors), and forms the other contacts B, D on another frame. The contacts A, C are laid in a jig, the spacer film 112 is laid over the bottommost contacts A, C, and the uppermost contacts B, D are laid over the spacer as shown. Adhesive can be used to hold the contacts in place on the spacer film and to control the amount of capacitive coupling. The contacts all lie on the same face of an imaginary sheet 50A (FIG. 3) except where two of the contacts A, C, are angled to lie on the opposite side of the sheet and of the spacer film 112 which lies coincident with the sheet. As shown in FIG. 4, each contact has an average width such as W for contact C, which is greater than its average thickness T.

Figure 5:
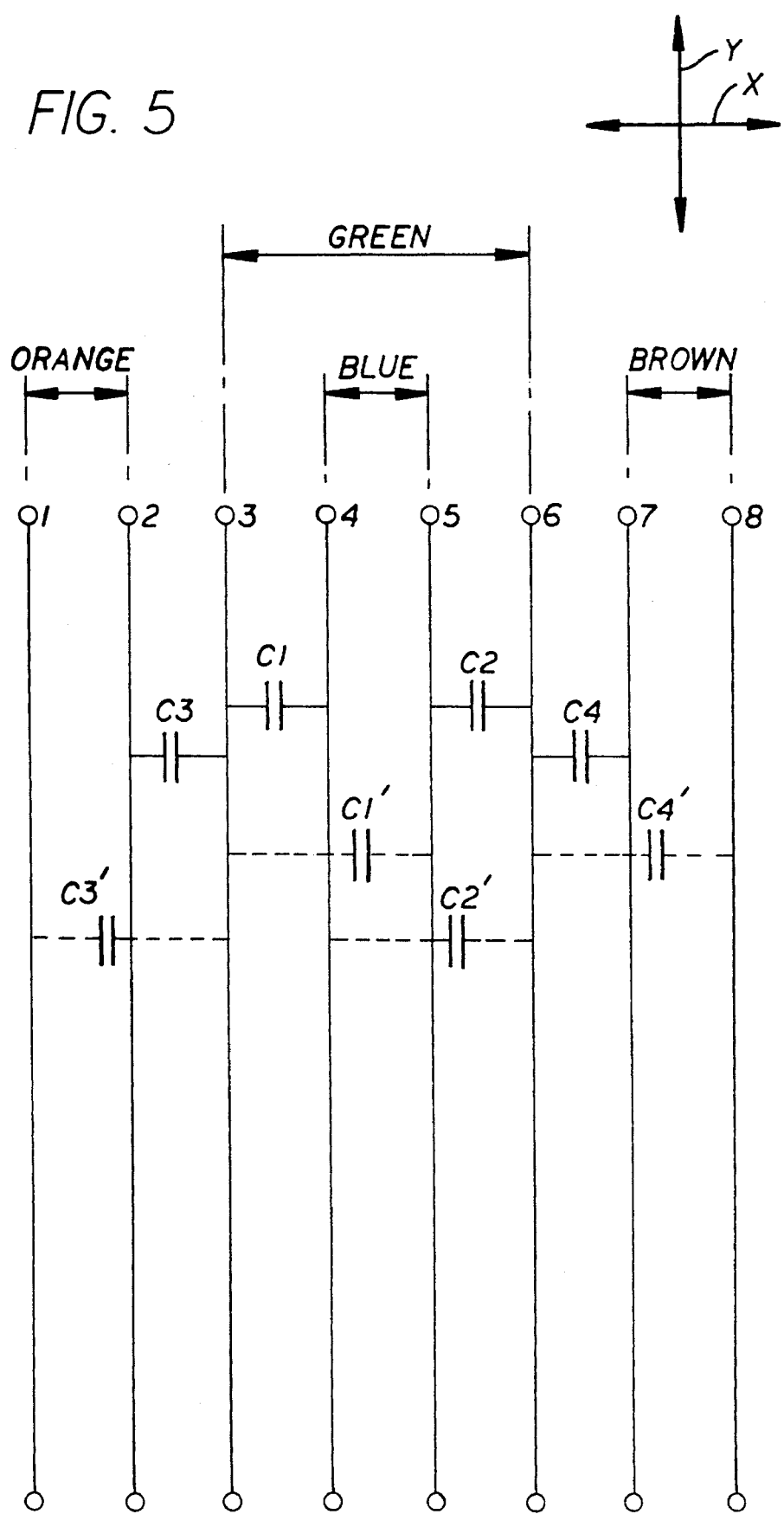
FIG. 5 is a schematic diagram of a group of connector contacts of a connector that includes four pairs of contacts.

FIG. 5 indicates contacts labeled 1–8 of another connector which contains four pairs of contacts. The pairs of contacts are labeled "orange", "green", "blue", and "brown". The green contacts 3, 6 are spaced apart by two blue contacts 4, 5. Because of the adjacency of contacts of different pairs, contacts of different pairs are electromagnetically coupled as indicated by capacitances C1, C2, C3, and C4. It is noted that no capacitance is shown between adjacent contacts of the same pair, since such capacitance is not relevant to the consideration of crosstalk. In order to cancel much of the crosstalk resulting from the capacitances C1–C4, applicant adds canceling capacitances labeled C1', C2', C3', and C4'.

Figure 6:
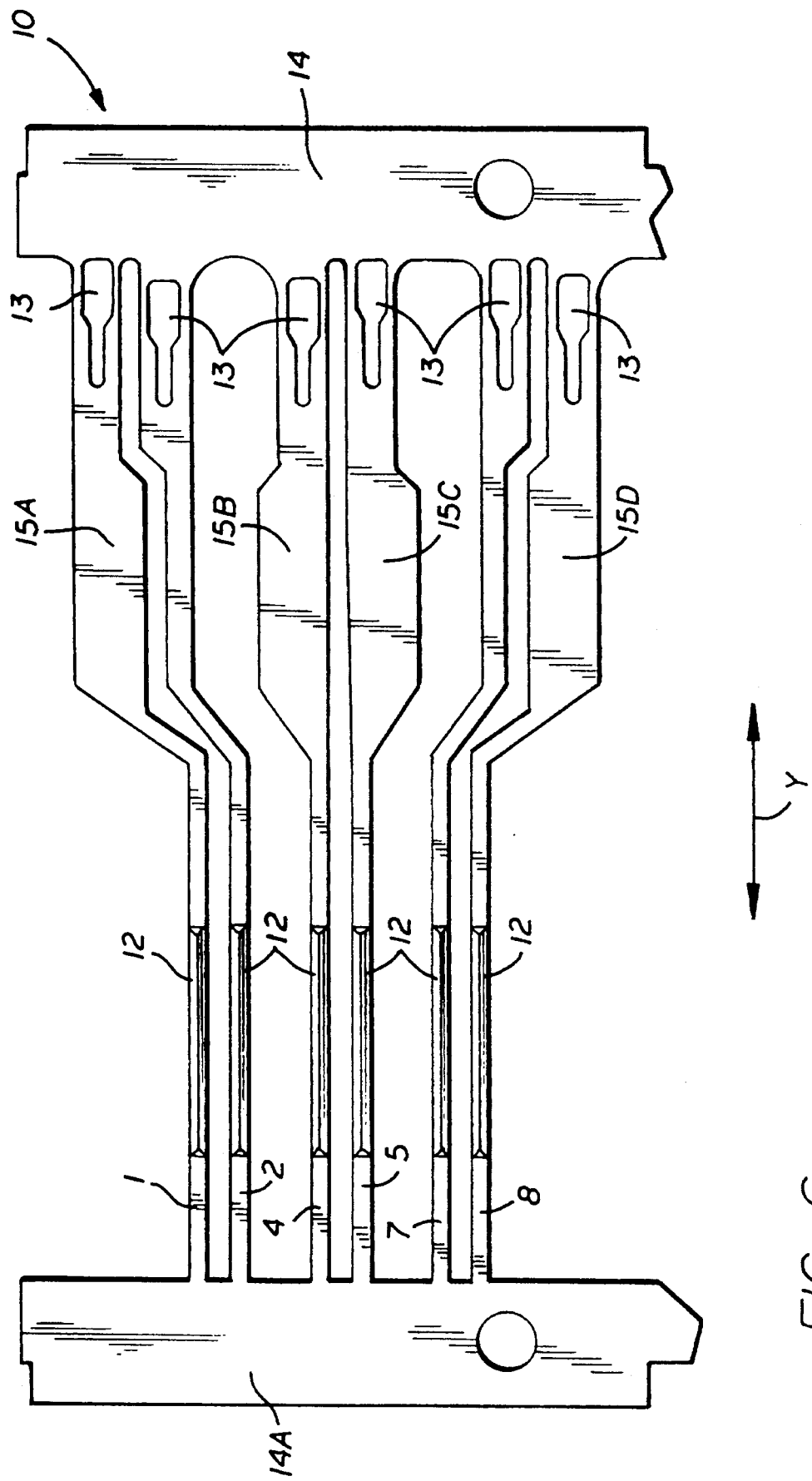
FIG. 6 is a plan view of a lead frame that provides six of the contacts of the connector indicated in FIG. 5.
Figure 7:
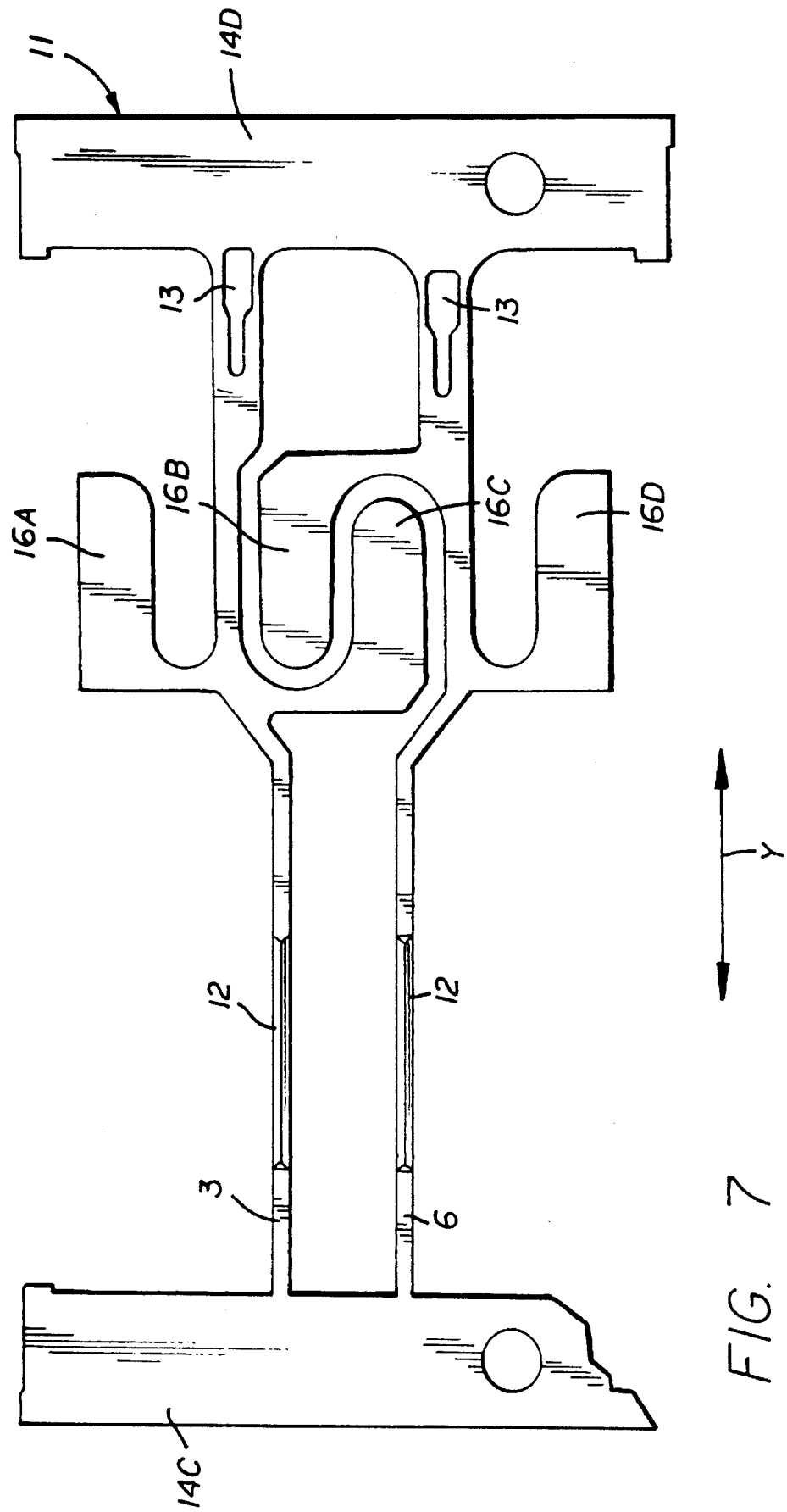
FIG. 7 is a plan view of a second lead frame that provides the two other contacts of the connector indicated in FIG. 5.

FIG. 6 shows a lead frame 10 formed from a thin sheet of metal such as beryllium copper or phosphor bronze, to define six of the contacts 1, 2, 4, 5, 7, and 8. FIG. 7 shows another lead frame 11 which is similarly formed to define the other two contacts 3 and 6. Only the contacts 3 and 6 have lateral extensions 16A–16D, with each lateral extension capacitively coupling to one other contact, as described below. In both lead frames 10 (FIG. 6) and 11 (FIG. 7) each of the contacts has an elongated tail 12, with the tails extending substantially parallel to each other in the longitudinal direction Y and forming one end of each contact. The other end of each contact has an elongated cutout 13 which can form the fork of an insulation displacement contact. The opposite ends of the contacts of the lead frame 10 of FIG. 6 are held in position by a pair of side rails 14, 14A. Similarly, the ends of the contacts of FIG. 7 are held in position by a pair of side rails 14B, 14C. The contacts will be severed from the corresponding side rails during manufacture of a connector.

Figure 8:
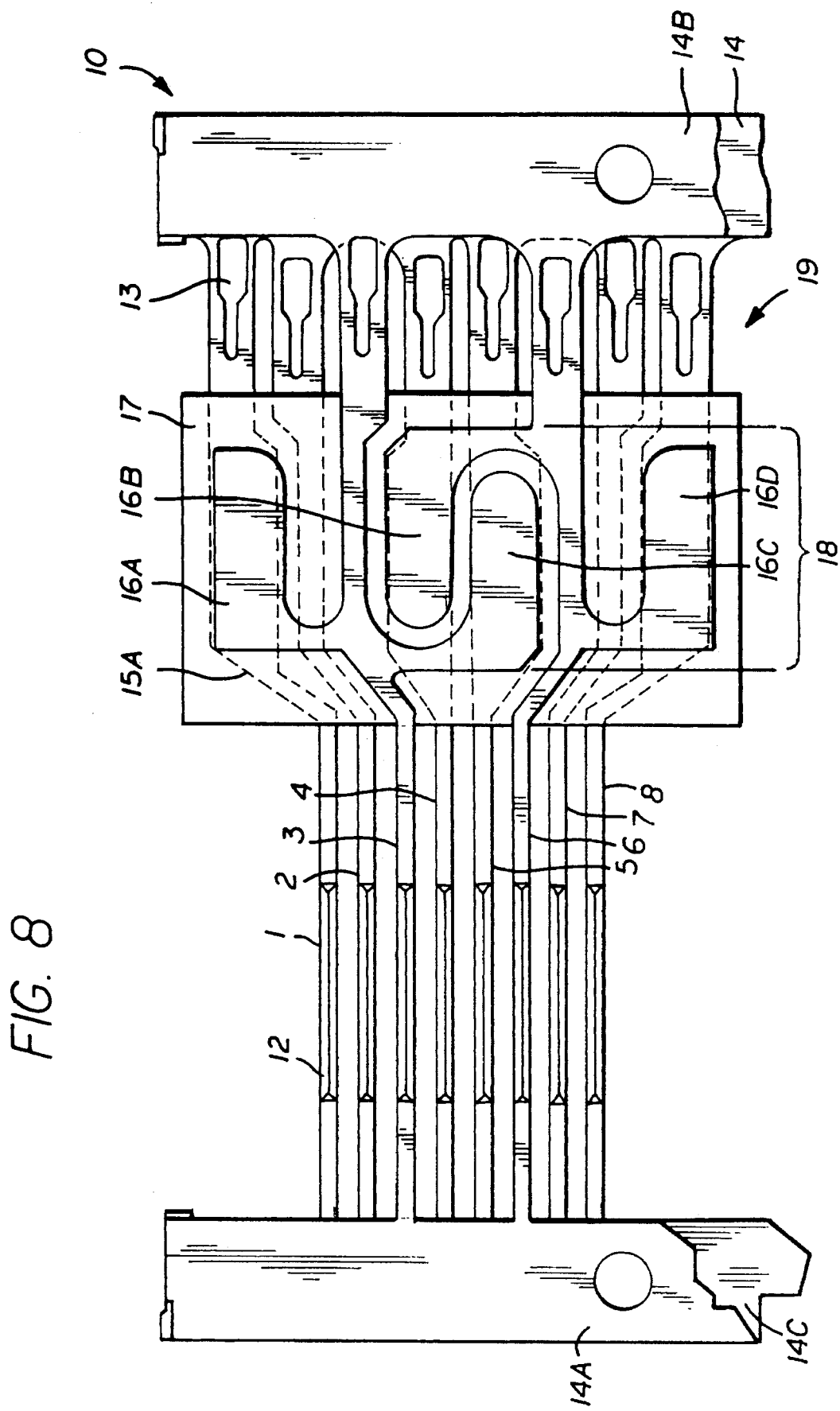
FIG. 8 is a plan view showing the lead frames of FIGS. 6 and 7 overlapped as they would be arranged in a connector, and also showing an insulating dielectric film.

As shown in FIG. 6, the terminals 1, 4, 5, and 8 have portions 15A, 15B, 15C, and 15D which are of greater width than the rest of the contacts. The portions 15A–15D are intended to lie facewise adjacent (but out of contact) with lateral extensions 16A, 16B, 16C, and 16D of the contacts of FIG. 7. FIG. 8 shows how the two groups of contacts of FIGS. 6 and 7 are mounted one on top of another and separated by an insulating film 17 in the local region 18. The two contacts 3, 6 which have the lateral extensions, lie above the film 17, while the other contacts 1, 2, 4, 5, 7, and 8 have portions lying below the film 17.

The film 17 may be of a wide range of dielectric materials, such as polyamide that is marketed under the trade name Kapton, and may have a small thickness such as 0.003 inches in thickness. Kapton is desirable because its dielectric constant remains at a substantially constant level with frequency, and because it is unaffected by many heating processes. The contacts are preferably secured to the film 17 by an adhesive, as by an acrylic coating that is secured to the contacts by heat bonding.

After the contact assembly 19 is formed, a middle portion of the contacts at the film 17 is encapsulated in a block of potting material. The opposite ends of the contacts are then severed from corresponding side rails 14–14C and the contacts are bent. FIG. 9A shows one of the contacts 8 after it has been bent around axes 50, 52 that extend parallel to the lateral direction X. Although the contacts are bent about laterally-extending axes, they (one face of each) lie substantially on an imaginary sheet 50 that is bent about parallel axes 50, 52. When a longitudinal line lies on such a sheet, such a line will bend about lateral axes with the sheet, but still may be considered to extend in a longitudinal direction (as it will appear in a vertical view). The longitudinal direction can also simply apply to the contacts before they are bent.

Figure 9:
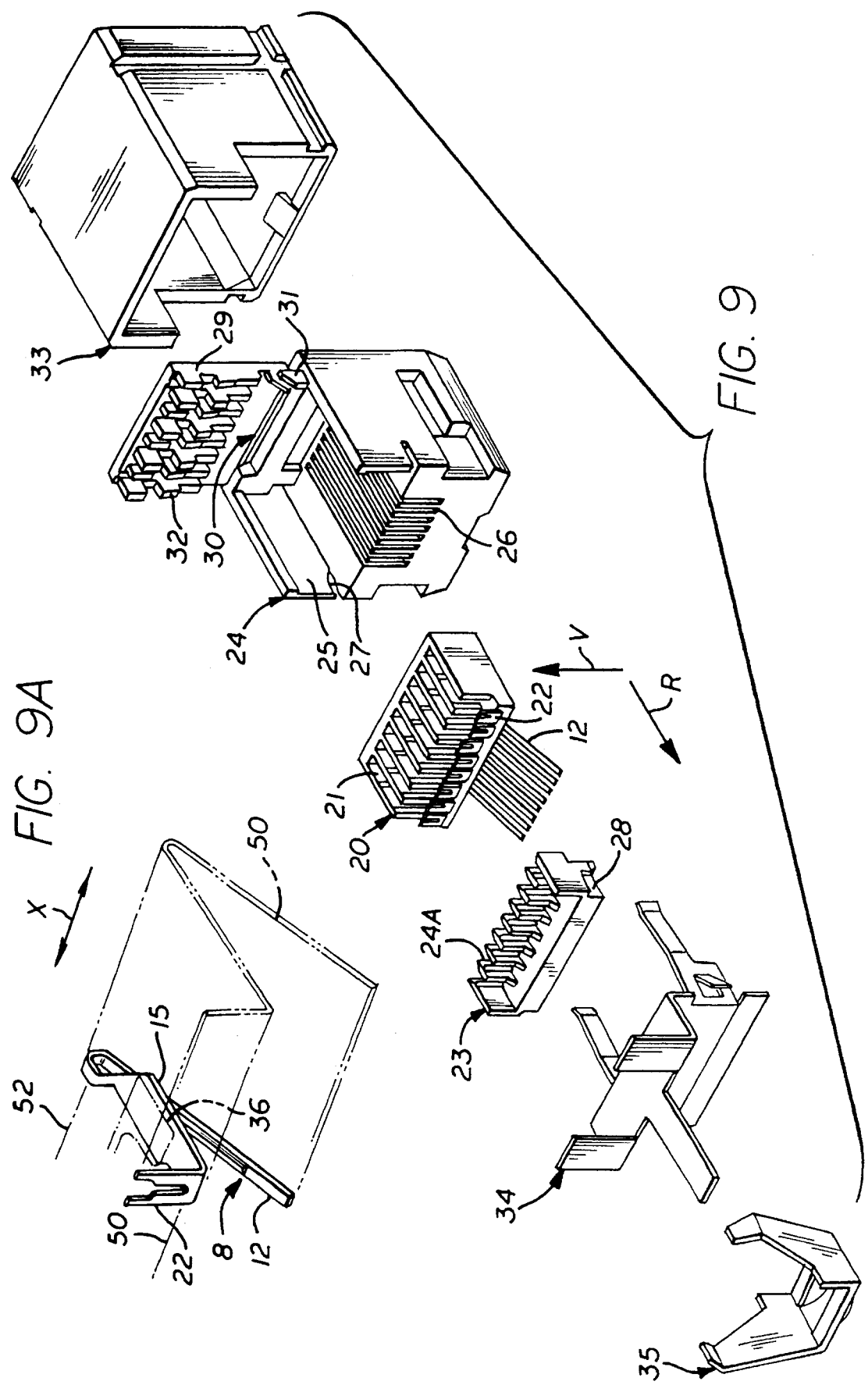
FIG. 9 is an exploded isometric view of the parts of a complete connector with contacts of the construction shown in FIG. 8.

FIG. 9 shows the plastic block 20 in which the middle of the contact arrangement is encapsulated. The block has eight parallel elongated slots 21 that are designed to receive insulated wires of a connecting cable (arranged in twisted pairs). The fork ends 22 of the contacts have been bent upwardly at right angles with respect to adjacent portions of the contacts, and the tails 12, have been bent at a downward and backward incline, in the downward vertical direction V and in the backward or rearward direction R. It may be noted that the forks have different heights, so that some wires are forced into their forks before others, to reduce the downward force necessary to terminate the wires to the connector contacts.

The connector of FIG. 9 includes a strain relief element 23 which fits over the forks 22 and mounts on the block 20. A molded plastic housing 24 has a top with a recess 25 which slidably receives the block 20 in which the connectors are mounted, as well as the strain relief element 23 that is mounted on the block. The housing has eight parallel slots 26 communicating with the recess 25 and designed to receive the tails 12 of the contacts. The slots 26 extend downwardly to a recess at the bottom of the housing which can receive a mating connector. The walls between the slots 26 separate the tails 12 and hold them in their inclined orientations. Latches 27 at opposite sides of the housing recess latch into recesses 28 on opposite sides of the strain relief element 23 to hold it and the block 20 in place.

The housing 24 includes a lid 29 which is formed during the molding of the housing and which is coupled to the rest of the housing by a thin bendable hinge line part 30. A side stop 31 initially holds the lid so it extends upwardly, and the side stop can be removed to pivot down the lid. The lid has eight elongated projections 32 which can fit into slots 21 in the block 20 to force insulated wires down into the slots and into the insulation displacement forks 22. Thus, to connect wires to the contacts, the wires are laid in the different slots 21 and the lid 29 is pivoted down to force the wires down and connect them to the contacts.

The connector includes an outer shell 33 formed of metal or plastic and designed to receive the housing 24. As the housing is inserted into the shell 33, the shell forces the lid 32 to pivot down (the stop 31 has been previously removed). When the housing 24 is fully inserted into the shell 33, the lid will have been pivoted down to terminate the wires to the contacts with the shell 33 holding the assembly in its final position. Where the shell 33 is formed of metal or has a metal coating thereon, it serves to protect the connectors from EMI (electromagnetic interference). A metal cable end screen 34 and securing clip 35 which holds the screen in place, also protect against EMI.

Figure 10:
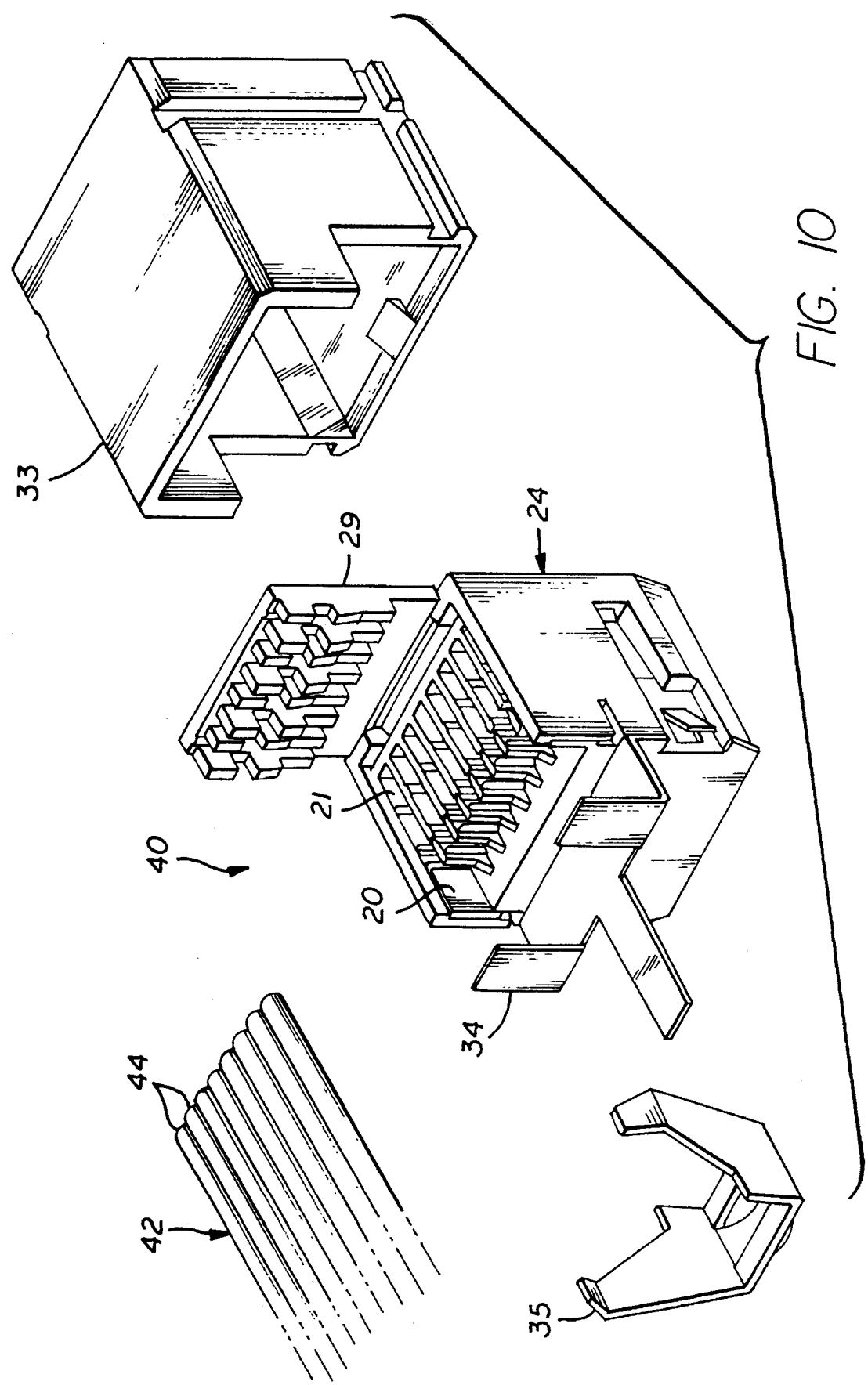
FIG. 10 is an exploded isometric view of the connector parts of FIG. 8 assembled in readiness for the connection of insulated wires thereto.

FIG. 10 shows an assembly 40 of the housing 29, block 20, metal screen 34, and contacts, ready for installation of a cable 42 that has eight wires 44. As mentioned above, the wires 44 are laid in the different slots 21, the housing 24 is inserted into the shell 33, and the clip 35 is installed to hold the cable 42 in position.

The crosstalk between parallel flat contacts due to capacitive and mutual inductive coupling (near end crosstalk or NEXT) depends upon the contact lengths (along which they are parallel and flat). Maximum such coupling occurs when their lengths equal a quarter wavelength of the frequency of signals passing through the contacts. At frequencies above and below the quarter wavelength frequency, the coupling drops at 20 dB per decade of frequency (6 dB per octave). For common present connector contacts having a length of two inches, a quarter wavelength occurs at a frequency of about 1.3 GHz. The crosstalk coupling at 100 MHz is about 30 dB lower. Reducing contact length to half as much results in a quarter wavelength at about 2.6 GHz, so crosstalk at 100 MHz is about 36 dB lower. Applicant's arrangement locates the lateral extensions, such as 36 in FIG. 9A, close to a termination at fork 22. This results in flat and parallel contact lengths that are only two-thirds those of prior art connectors, resulting in crosstalk that is 34 dB below the maximum crosstalk (as compared to 30 dB for prior longer contacts).

Applicant's placement of lateral extensions (such as 36 in FIG. 9A) and wide portions 15 close to one end, such as 22, of the contacts, results in more complete cancellation of crosstalk. It takes time for a signal to travel along a contact, so there is significant phase delay, or shift, between input and output ends of a contact. For a contact length of about two inches, the phase shift is about 10 degrees at 100 MHz. If cancellation is far from an input end of the contact, or if the cancellation device (e.g. lateral extension 36 in FIG. 9A) is long, this may increase the phase shift and prevent almost complete cancellation of crosstalk. Applicant's lateral extensions, which lie near a contact end and which are of short length, minimize signal phase shift along the contact and produce large crosstalk cancellation.

Applicant places the crosstalk cancellation circuit at the location 130 which is the average of the middles of the lateral extensions (along the contact length). The location 130 lies at a distance M from the average locations 132 of the adjacent termination ends 134 (where contact is made with a conductor outside the connector), where M is preferably no more than one-third of the contact length L, and is more preferable no more than 25% of L. In FIG. 2 M equals about 25% of L. Also, the closest distance N of the lateral extension (at the top of extension end 124) from the termination end locations (at 132) is preferably no more than 20% of the length L and more preferably no more than 10% of the length L. In FIG. 2, N equals about 10% of the length L. Also, the length P along which crosstalk cancellation occurs, is preferably less than one-half the overall length L, with P shown as about 36% of L.

While terms such as "vertical", "bottom", etc. have been used herein to aid in the description of the invention, the connector can be used in any orientation with respect to gravity.

While applicant has described embodiments for two and four pairs of contacts, the present invention is effective for a connector which includes any number of pairs of contacts. It also should be understood that while applicant describes the contacts being stamped from a metal sheet and mounted on a dielectric film, it is possible for contacts to be formed on a circuit board or flex board as by etching, and with contacts coupled by placing lateral extensions of the contacts on opposite sides of the circuit board or on opposite sides of an applied dielectric film.

Thus, the invention provides a connector which reduces crosstalk between pairs of contacts in a low cost and rugged construction. Contacts which extend primarily in a longitudinal direction and which are to be capacitively coupled, are manufactured so one contact is formed with a lateral extension which lies facewise adjacent but spaced from a portion of the other contact. Where the contacts are formed from a sheet of metal, they can be held together by a sheet or film of dielectric material lying at the contact locations where there are lateral extensions.

The novel features of the invention are set forth with particularity in the appended claims. The invention will be best understood from the following description when read in conjunction with the accompanying drawings.

We claim:

1. An electrical connector that includes a housing and at least four longitudinally elongated and laterally spaced contacts mounted in said housing, with each contact having opposite ends, said contacts including first and second signal carrying pairs of contacts, with an initial contact in each pair lying adjacent to an initial contact of the other pair, and with a secondary contact of each pair not lying adjacent to the initial contact of the other pair, wherein the initial contact of said second pair and the secondary contact of said first pair have overlying portions that are laterally coincident but slightly vertically spaced, with a dielectric between them, to provide close capacitive coupling between them while keeping them out of direct contact with each other, wherein:

said contacts are each stamped from a sheet of metal, and one of said contacts which has an overlying portion, is formed with an integral laterally extending extension, said extension having a longitudinally narrow middle that overlies one of said contacts that lies laterally between said initial contact of said second pair and said secondary contact of said first pair, said extension having a longitudinally longer end portion that is more than three times as long as the longitudinal length of said middle and that overlies said other of said contacts which has an overlying portion which lies over substantially the entire length of said end portion.

2. The connector described in claim 1 wherein:

said housing has a plastic molded portion;

parts of said plurality of contacts which have overlying portions lie in a local region, as well as said layer of dielectric material, are encapsulated in said plastic molded portion of said housing.

3. A connector which includes a housing and a plurality of contacts mounted on said housing, wherein said contacts extend longitudinally and are spaced laterally along most of their lengths, as seen in a plan view, wherein said contacts each have an average lateral width in a lateral direction which is greater than its thickness in a vertical direction, and wherein said plurality of contacts includes at least first and second pairs of contacts, where there is crosstalk between said first and second pairs of contacts, and wherein said connector is constructed to provide a capacitive coupling between contacts of a set of contacts that each includes a contact of each of said pairs, to at least partially cancel said crosstalk, wherein:

one of said contacts (B) of said set has a lateral extension (110) that extends to a position overlying the other of said contacts (C) of said set, and including a layer (112) of dielectric material lying between said lateral extension and said other of said contacts of said set;

one (A) of said plurality of contacts is an intermediate contact that lies laterally between said contacts (B, C) of said set;

said lateral extension has a middle (128) that overlies said intermediate contact and an end portion (114) that overlies the other contact of said set, with said middle having less than half as much area overlying said intermediate contact as the area of said end portion which overlies said other of said contacts of said set.

4. The connector described in claim 3 wherein:

said housing has a plastic molded portion;

portions of said plurality of contacts as well as said layer of dielectric material, are encapsulated in said plastic molded portion of said housing.

5. An electrical connector which includes a housing with a plastic molded portion, and a plurality of largely longitudinally extending but laterally spaced elongated contacts, including first and second pairs of contacts, with said first pair including first initial and first secondary contacts and said second pair including second initial and second secondary contacts, wherein said first and second initial contacts of said first and second pairs extend largely parallel to each other and lie adjacent to each other along most of their lengths so there is high potential for crosstalk between them, and wherein a set of contacts that includes said first secondary contact and said second initial contact are capacitively coupled to minimize such crosstalk, wherein:

said connector includes a local region of less than half the longitudinal length of any of said pairs of contacts, where one contact of said set has a laterally-extending portion with an overlapping part that lies facewise adjacent to but out of direct contact with the other contact of said set, which creates a capacitive coupling between contacts of said set;

said first secondary contact and said second initial contact are first locally coupled contacts;

along most of the lengths of said plurality of contacts within said connector, said contacts lie on a surface of an imaginary sheet that has opposite faces and extend parallel to each other, but in said local region said first locally coupled contacts have contact portions that lie facewise adjacent but on different faces of said imaginary sheet, and including an actual sheet of dielectric material occupying the position of said imaginary sheet and separating said facewise adjacent contact portions;

portions of said contacts which lie in said local regions, as well as said actual sheet of dielectric material, are encapsulated in said plastic molded portion of said housing.

6. An electrical connector that includes a housing and at least four elongated and laterally spaced contacts mounted in said housing, with each contact having opposite ends, said contacts including first and second signal carrying pairs of contacts, with an initial contact in each pair lying adjacent to an initial contact of the other pair, and with a secondary contact of each pair not lying adjacent to the initial contact of the other pair, wherein:

the initial contact of said second pair and the secondary contact of said first pair have overlying portions that are laterally coincident but slightly vertically spaced to provide close capacitive coupling between them while keeping them out of direct contact with each other;

said overlying portions lie in a local region of said contact, and said overlying portions have lateral widths that are greater than the average lateral widths of said contacts outside said local region.

7. An electrical connector which includes a housing and a plurality of largely longitudinally extending but laterally spaced elongated contacts, including first and second pairs of contacts, with said first pair including first initial and first secondary contacts and said second pair including second initial and second secondary contacts, wherein said first and second initial contacts of said first and second pairs extend largely parallel to each other and lie adjacent to each other along most of their lengths so there is high potential for crosstalk between them, and wherein a set of contacts (B, C) that includes said first secondary contact and said second initial contact are capacitively coupled to minimize such crosstalk, wherein:

said connector includes a local region (120) of less than half the longitudinal length of any of said pairs of contacts, where one contact (B) of said set has a lateral extension (110) with an overlapping part (114) that lies facewise adjacent to but out of direct contact with the other contact (C) of said set, which creates a capacitive coupling between contacts of said set, wherein said extension has a single primarily laterally extending middle part (128) and has an extension end (114) connected to said middle part and forming said overlapping part, with said extension end connected to the rest of said one contact only through said single middle part.

8. An electrical connector that includes a housing and at least four longitudinally elongated and laterally spaced contacts mounted in said housing, with each contact having opposite end portions, said contacts being arranged so that along said end portions first and second of said contacts lie adjacent to each other, a third contact lies adjacent to said first contact but not to said second contact, and a fourth contact lies adjacent to said second contact but not to said first contact, wherein:

said contacts are each formed of sheet metal, said third contact includes an integral laterally extending extension having a longitudinally long third end portion with said third end portion overlying said second contact, said third end portion being connected to the rest of said third contact by a single longitudinally smaller third middle portion, and said fourth contact includes an integral laterally extending extension having a longitudinally long fourth end portion with said fourth end portion overlying said first contact, said fourth end portion being connected to the rest of said fourth contact by a single longitudinally smaller fourth middle portion.

9. The connector described in claim 8 wherein:

each of said contacts has an average lateral width, said third end portion is laterally wider than the average lateral width of said third contact, and said fourth end portion is laterally wider than the average lateral width of said fourth contact.

10. The connector described in claim 8 wherein:

said extensions of said third and fourth sheet metal contacts are of substantially identical shapes, but are differently oriented.

* * * * *